United States Patent [19]
Garrett et al.

[11] Patent Number: 4,806,357
[45] Date of Patent: Feb. 21, 1989

[54] APPARATUS AND METHOD FOR ENCAPSULATING SEEDS AND THE LIKE

[75] Inventors: Roger E. Garrett; Nelson E. Smith, Jr.; James J. Mehlschau, all of Davis, Calif.

[73] Assignee: The Regents of the University of California, Berkeley, Calif.

[21] Appl. No.: 125,397

[22] Filed: Nov. 25, 1987

[51] Int. Cl.$^4$ ............................................. A01C 1/06
[52] U.S. Cl. ......................................... 427/4; 47/57.6; 118/506; 118/712; 264/5; 425/10; 427/8; 427/212
[58] Field of Search .......................... 264/4, 5, 7, 9, 12, 264/40.1, 40.2; 425/5, 6, 7, 10; 47/57.6; 427/4, 8, 212; 118/506, 670, 712

[56] References Cited

U.S. PATENT DOCUMENTS 2,766,478 10/1956 Raley, Jr. et al. .................. 264/4
4,344,787 8/1982 Wang et al. ........................ 65/21.4
4,670,035 6/1987 Lee et al. ............................ 65/21.4

Primary Examiner—Jan H. Silbaugh
Assistant Examiner—Mary Lynn Fertig
Attorney, Agent, or Firm—Owen, Wickersham & Erickson

[57] ABSTRACT

A device for encapsulating seeds in a gel. A nozzle with dual vertical, rectilinear, concentric tubes—i.e., an inner tube and an outer tube—is supplied with gel that is fed into the outer tube. The gel goes down the outer tube to an outlet from the inner tube, so that a meniscus of gel is stretched across the outlet. Singulated seeds are fed into an inlet of the inner tube, so that each seed—and only one—drops down upon a meniscus of gel. A slight puff of air is caused to pass down the inner tube and slightly inflate the meniscus upon which a seed has dropped. More gel is fed, to cause the meniscus to separate from the outlet and form a drop of gel with a seed inside, which drops down into a fixative bath that causes the gel to set.

27 Claims, 8 Drawing Sheets

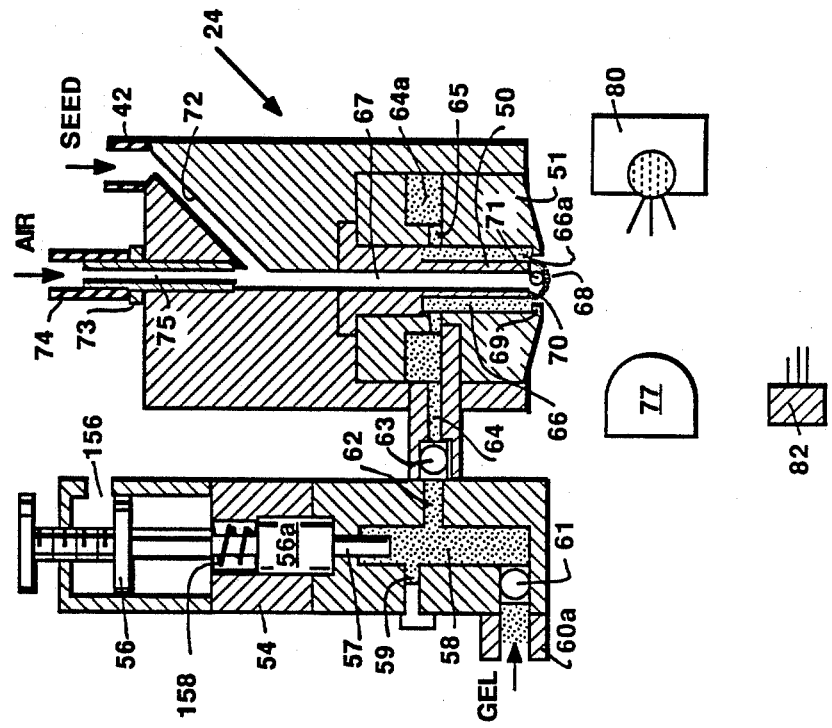
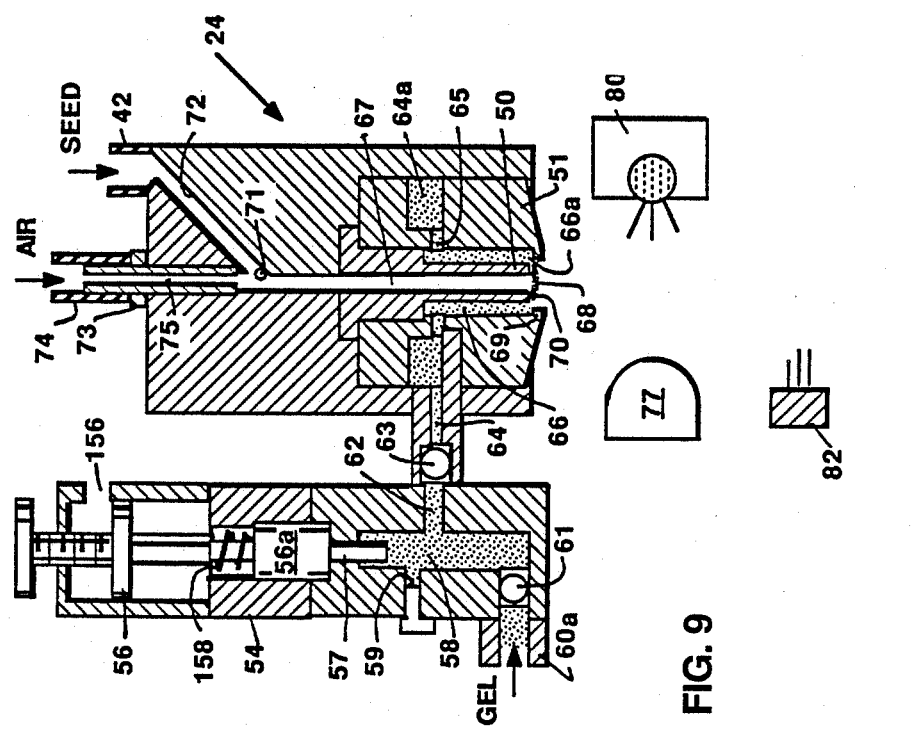

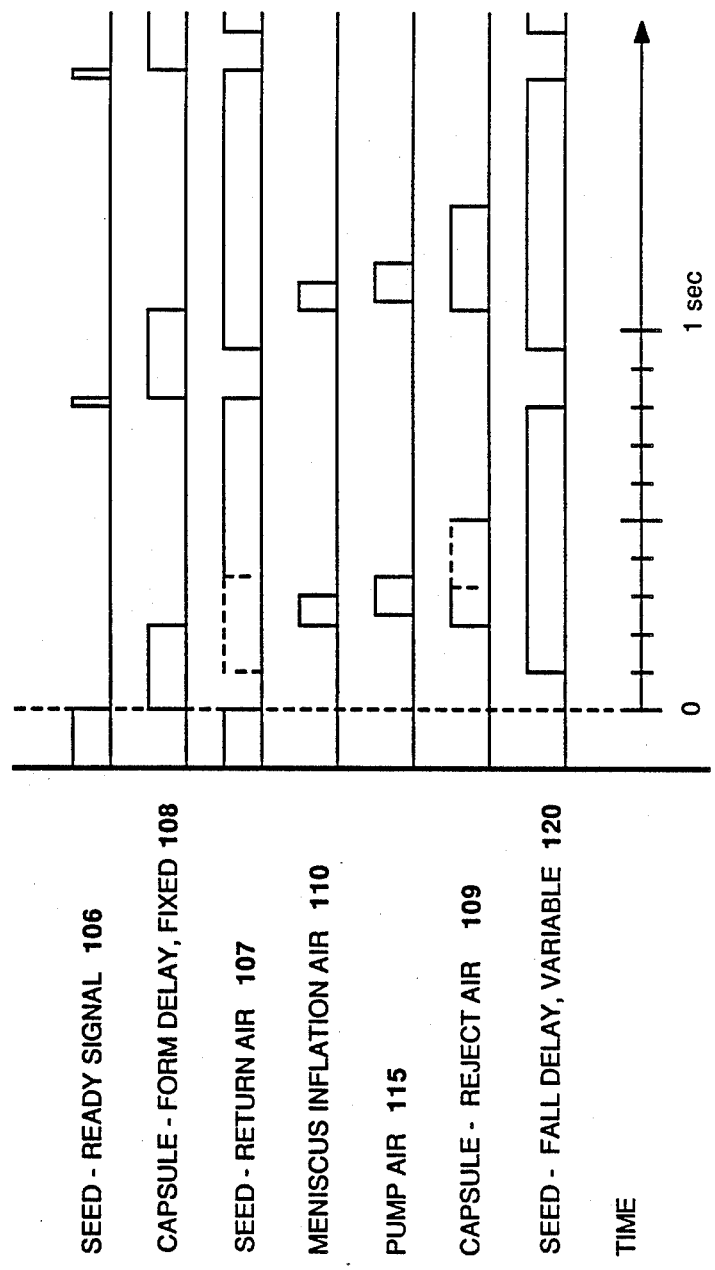
FIG. 14  CONTROL SEQUENCE, AUTOMATIC MODE
SECOND GENERATION SEED ENCAPSULATION MACHINES

APPARATUS AND METHOD FOR ENCAPSULATING SEEDS AND THE LIKE

This invention relates to apparatus and method for encapsulating seeds in a gel coating. It is also useful for other things than seeds.

BACKGROUND OF THE INVENTION

The concept is to incorporate a single tomato seed (or other such seed) into a drop of gel as the drop is forming. The drop of gel, with the seed inside, then falls into a bath of a chemical which fixes or sets the gel.

An object of the invention is to provide accurate encapsulation of seeds.

Another object is to achieve encapsulation speeds enabling a group of drop-forming units with the ability to produce encapsulated seeds at a steady state rate, such as 540,000 per eight hours, allowing for normal maintenance and repairs.

Another object of the invention is to provide seed encapsulations that are approximately spherical and are uniform and consistent, with volumes of about 80 microliter per capsule.

Another object is to hold the number of faulty encapsulations, i.e., those that fail to contain a seed, down to less than 0.2% of the total encapsulations.

An additional object is to hold the occurrence of crushed or broken seeds attributable to the machine to less than 0.2%.

A further object is to pass to the gel fixative only gel capsules that incorporate a seed, deflecting the empty gel capsules for possible re-use while avoiding their mingling with the seed-containing capsules.

Another object is to count accurately both the good and bad capsules.

SUMMARY OF THE INVENTION

The heart of the apparatus is a vertical nozzle with dual concentric vertical tubes. Seeds pass, one at a time, through the center tube, and gel passes through the outer tube. At the beginning of a cycle, a meniscus of descending gel forms and stretches across the bottom end of the inner or center tube. A seed, metered into the upper end of the inner or center tube, falls down to and rests on this meniscus of gel. (Alternatively, the cycle may be timed to begin with the arrival of a seed at the meniscus.) A small puff of air in the center tube inflates the meniscus slightly; immediately, gel is pumped into the outer tube with a velocity sufficient to cause separation of a drop of the gel with the seed captured inside it at completion of the pump cycle. The drop of gel falls into a bath of water containing a fixative chemical which causes the gel to set.

Methods of singulating seeds and feeding them are known: rotary vibrators are commercially available which appear to be adequate to serve, with important modifications, as the basis for the singulating and feeding operations. Hand labor may be utilized for loading supplies into the machine and for handling the finished capsules. The seeds may be metered and singulated by a bowl vibrator having one or two spiral ledges along its inner surface. Vibration causes the seeds to climb the spiral ledges; the width of the final portion of each spiral ledge is such that only a single file of seeds can pass.

An air jet at the upper end of the spiral ledge blows each seed back into the bowl until a signal that a seed is needed for the inner tube of the encapsulation nozzle, acts to disable the air jet at the ledge, at the beginning of each encapsulation cycle. On this signal, the air jet for the spiral ledge is shut off, and it remains off until a sensor detects a seed in the delivery tube going to the nozzle; at that time, the air is turned back on to remain on and return seeds to the bowl until the next seed is called for by the encapsulation.

At a predetermined time following delivery of a seed, an air jet sends the small puff of air into the upper end of the center tube of the nozzle, to inflate the meniscus slightly; this is followed at a controlled interval by the pump action which delivers the measured quantity of gel to the outer tube and ejects the drop of seed-containing gel.

The machine provides a count of the drops as they are dropped, so that the number of encapsulated seeds is provided and depletion of the store of seeds in the vibrator is noted. It is advantageous at this counting stage to separate the deficient drops without seeds from those with seeds and to provide a separate count of the drops with seeds. For this purpose, as each drop of gel falls toward the fixer bath, it passes a sensor which inspects each falling drop, and if no seed is detected, an air jet deflects the falling drop away from this vertical path and away from the fixative bath. If a seed is detected, the sensor acts to shut off the air jet and the drop falls down a vertical path to the fixative bath.

Provisions for additional inspection and sorting of cured drops may be provided, if necessary, to ensure that no more than 0.2% of the delivered capsules are void of seeds.

The device may be constructed so that a single vibrator bowl has two spiral ledges and feeds seeds to two of the nozzles, each of which is provided with its own supply of gel and valving for the gel. Similarly, below the two nozzles, the device is provided with a single fixative bath into which the encapsulated seeds from both nozzles can fall. There is a sensor system below each nozzle for sensing whether there is a seed in each falling drop and for deflecting any drop that fails to contain a seed.

Other objects and advantages of the invention will appear from the following description of a preferred embodiment.

BRIEF DESCRIPTION OF THE DRAWINGS

FIG. 4 is a fragmentary view in elevation and in section of the seed delivery tube for one nozzle assembly.

FIG. 5 is a fragmentary view in elevation and in section of the other said delivery tube from the vibrator bowl to the other nozzle assembly.

FIG. 9 is an enlarged fragmentary view in section of a portion of one nozzle assembly, showing the meniscus formed by the alginate gel before the seed falls thereon and the sensing and deflecting apparatus below the nozzle.

FIG. 10 is a similar view with a seed on the meniscus and the meniscus partially inflated.

FIG. 14 is a control sequence-diagram for the automatic mode of the device.

DESCRIPTION OF A PREFERRED EMBODIMENT

Figure 1:
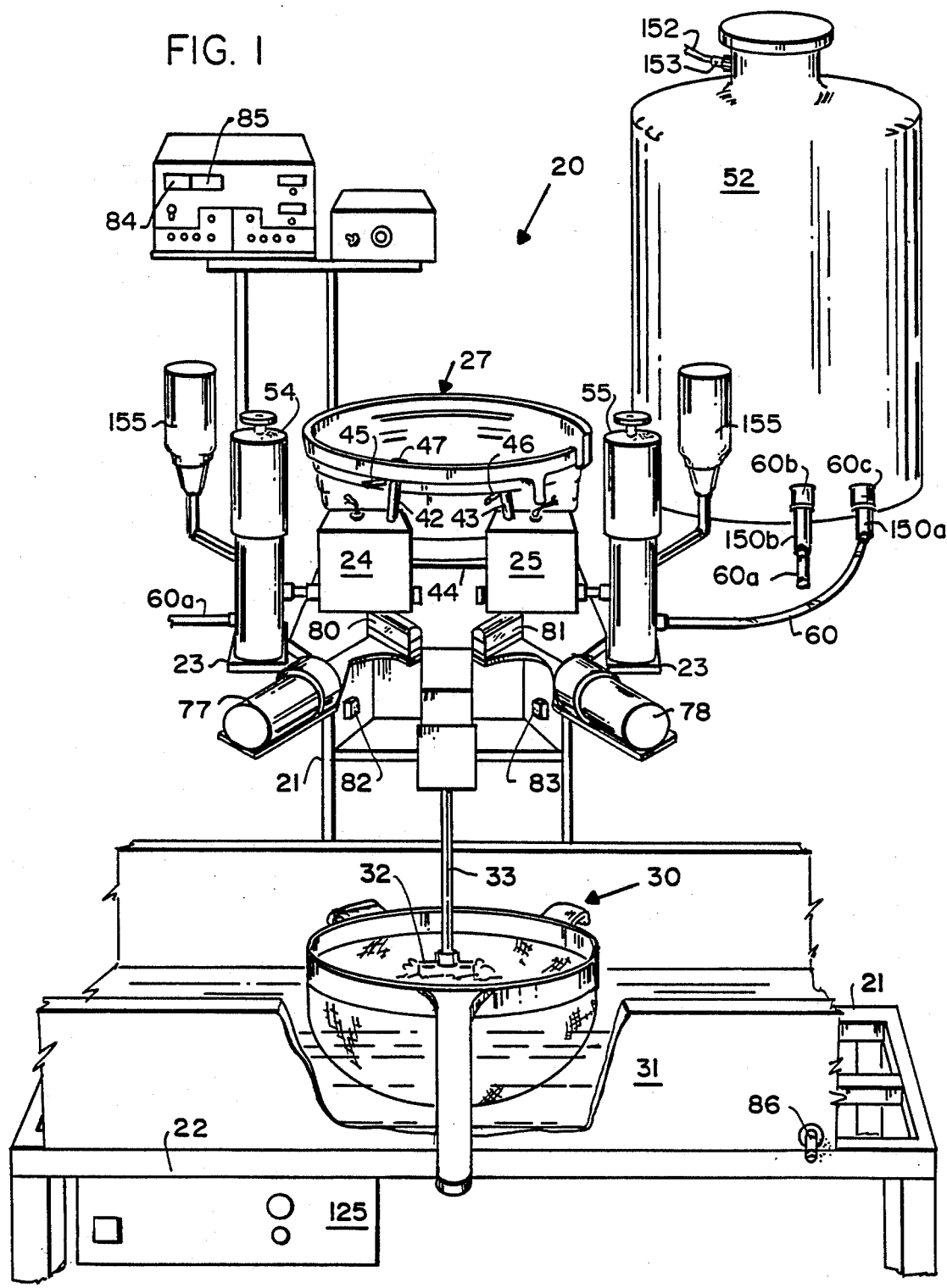
FIG. 1 is a view in perspective, with parts broken away, of an apparatus embodying the principles of the invention. Here, a pair of nozzle assemblies is combined with a single vibrator bowl and a single fixative bath.
Figure 2:
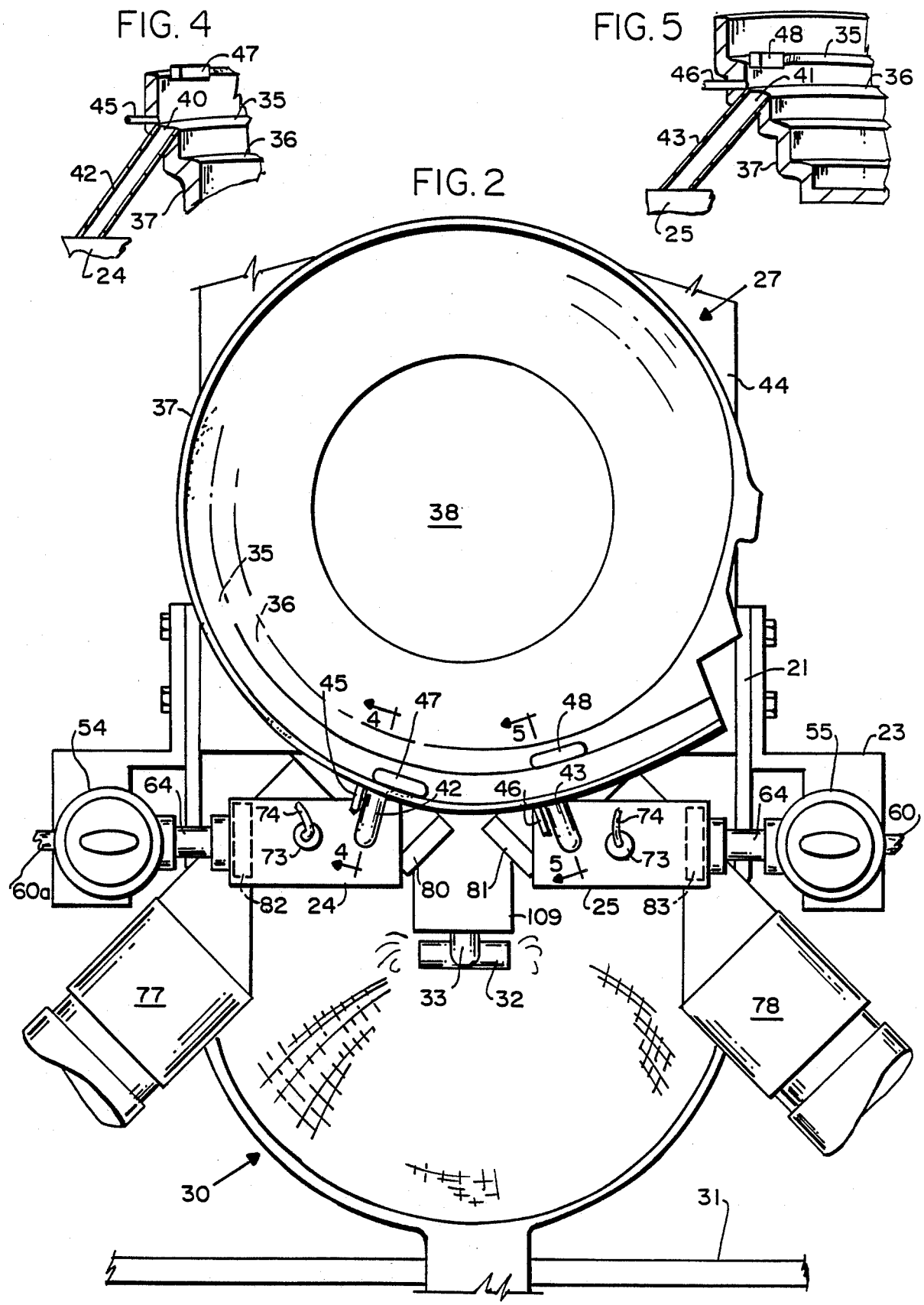
FIG. 2 is a top plan view of a central portion of the apparatus of FIG. 1, partly broken away and showing the single vibrator for supplying seeds to two separate nozzles, and below the nozzles is a drop sensing apparatus and a basket in a chemical bath for catching the encapsulated seeds.
Figure 3:
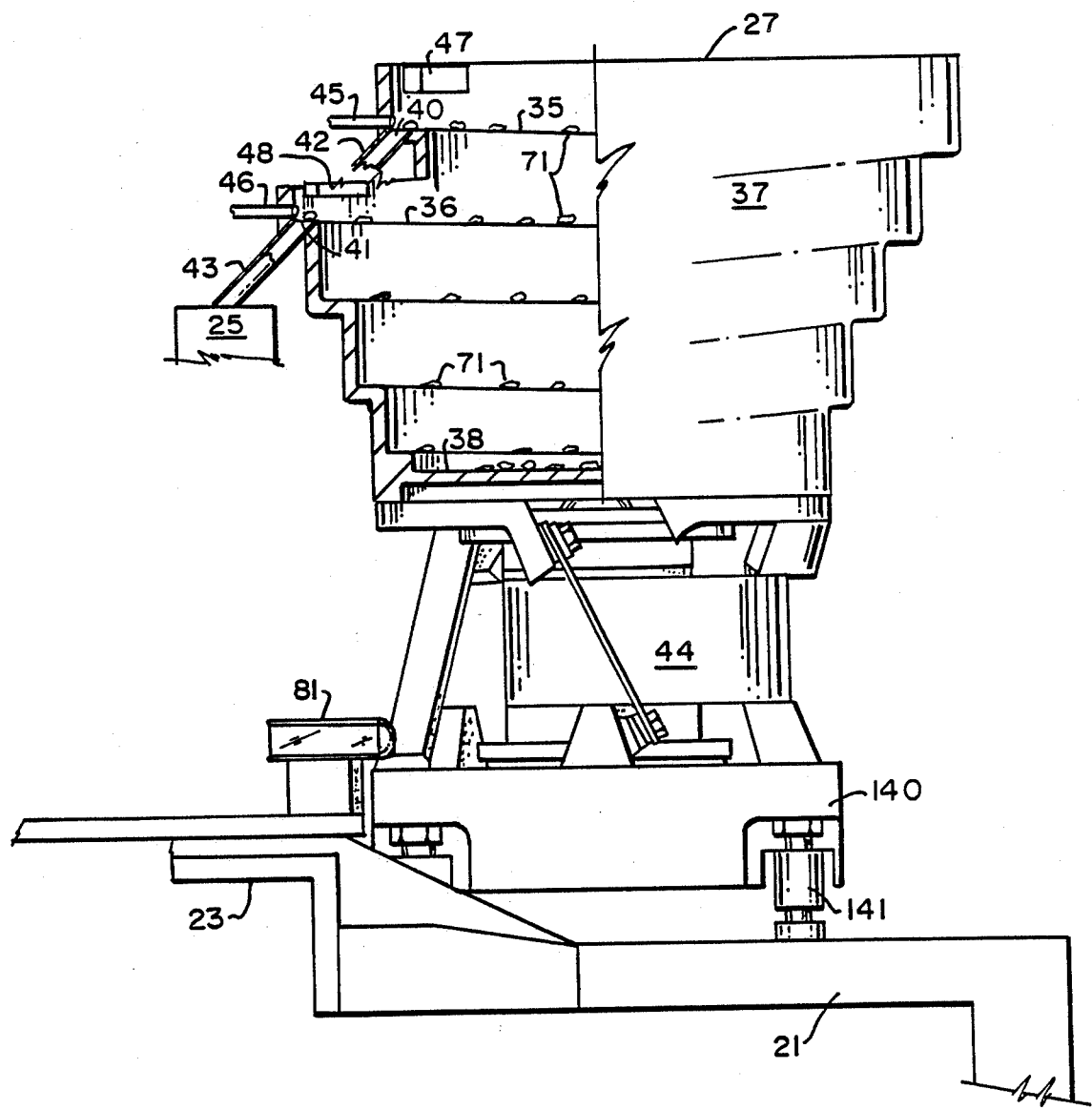
FIG. 3 is a view in elevation and partly in section of the vibrating bowl of FIG. 1.

Overall view (FIG. 1)

A device 20 for practice of the invention is shown in FIG. 1. It includes a main frame 21, which supports, above a table-like surface 22, other members, including nozzle-supporting frames 23. Preferably, a single main frame 21 supports from two to four drop-forming units or nozzle assemblies, two such units 24 and 25 being illustrated in FIG. 1. Each nozzle assembly 24 or 25 includes a main nozzle 26 (See FIGS. 6–12) to which gel and seeds are fed.

The main frame 21 also carries a vibrator bowl 27 feeding both nozzle assemblies 24 and 25 with one seed at a time.

Each nozzle 26 causes a series of seed-encapsulated drops of gel to be formed and dropped therefrom. They fall into a single basket 30 for collecting the seed-containing drops, the basket 30 being placed loosely in a tub-like member 31 containing a chemical fixative for the gel that instantly stabilizes each such drop, which then must remain in the bath a minimum of 20 minutes for proper hardening. The basket 30 may have an agitator 32 supplied by a tube 33 with air that bubbles through the fixative solution and agitates it.

Preferably, the machine 20 is so constructed that its components can be passed conveniently through a normal 36″ wide doorway. Preferably, the machine incorporates, to the extent feasible, off-the-shelf components. Preferably, modular design is utilized throughout to provide flexibility and to enable rapid interchange of components for repair and to facilitate future retrofits for possible new product types, sizes or configurations.

The supply of singulated seeds (FIGS. 1 to 5)

The vibrating bowl 27 is used for singulating the seeds and supplying them, one at a time, to each of the two nozzle assemblies 24 and 25. Thus, the vessel 27 may have a generally bowl-like shape with a pair of spiraling ramps or ledges 35 and 36 counterclockwise as viewed in FIG. 2, each leading up along a side-wall 37 of the bowl 27 from the bottom 38 of the bowl 27 to a respective outlet opening 40 or 41 at or near the upper end of the respective ledge 35 or 36. Each opening 40 and 41 leads to a respective delivery tube 42 or 43, one for each nozzle assembly 24 or 25. Movement of seeds up the spiral ledges 35 and 36 is aided by a vibrator 44.

The vibrator 44 rests on a base 140, and vibration isolators 141 between the vibrator base 140 and the frame 21 prevent the vibrations from being transmitted into the frame 21 and to cause fluid to creep from the nozzles 26 into the meniscus. The purpose of the vibrated bowl 27 is to feed seeds, one at a time, to the delivery tubes 42 and 43, but only at a rate such that the seeds will be provided to the respective nozzle assembly 24 and 25 only when desired, rather than in a continuous stream. For this purpose, near the top of each spiral path 35 and 36, there is provided, an air jet nozzle 45 or 46 (See FIG. 3) to blow the seeds back into the bowl 27. Thus, the seed will normally be recycled into the bowl 27, rather than delivered through the delivery tube 42 or 43. The vibrator 44 continues to vibrate the bowl 27 at all times, and the air jet nozzle 45 or 46 is normally activated. However, when a seed is needed, the air circuit (discussed later) acts to disable each of the air jet nozzles 45 and 46 to cut off or divert the air jet from the outlet 40 or 41 and thereby prevents the air jet nozzle 45 or 46 from returning the seeds back to the bottom 38 of the bowl 27 and then the ledge 35 or 36 supplies a single seed to the delivery tube 42 or 43. At that time a detector 47 or 48, is focused on the left hand edge of the upper opening 40 or 41 of each seed delivery tube 42 or 43. Each detector 47 and 48 senses a seed as it moves over the edge of the respective opening and into the seed delivery tube, 42 or 43. The detector 47 for the opening 40 is preferably focused on the left hand edge of opening 40 on the outer ramp 35. The detector 42 for opening 41 is preferably focused on the left hand edge of opening 41 on the inner ramp 36. The detectors 47 and 48, as described later, indicate each time the bowl 47 delivers a seed to the respective nozzle assembly 24 or 25 and cause the air jet nozzles 45 and 46 to blow seeds back into the bowl 27 again.

If desired, at the lower end of each delivery tube 42 and 43 a flap gate (not shown) may be pivotally mounted at one end, so that the flap gate is normally closed and will hold a seed in readiness until it is desired to deliver the seed into the nozzle assembly 24 and 25. The flap gate may be opened by a jet of air or other means to let that seed pass through it and into the nozzle assembly 24 or 25. This is not, however, usually necessary.

In the preferred device, six to nine ounces of tomato seed will take care of a days operation for each segment of the machine, that is, from the feeder bowl 27 to a pair of nozzles 24 and 25. Other seeds may operate at a different rate. The feeder bowl 27 is preferably filled no more than about half full; so that half to three-fourths of the ramps 35 and 36 supplying two delivery tubes 42 and 43 is above the level of the seed. The bowl 27 is refilled by the operator from time to time.

The nozzles 26 and the gel supply system (FIGS. 1, 2 and 6–12)

Each of the nozzle assemblies 24 and 25 includes a nozzle 26 which has a pair of vertical, rectilinear, concentric tubes 50 and 51 (See FIGS. 7 and 9–12). Of these, an inner tube 50 is, used for the flow and delivery of seeds, and an outer tube 51 is used for the flow and delivery of gel.

The gel is preferably formed from sodium alginate, although other things can be used. Thus, sodium alginate in dry powder form, may be mixed at the rate of about twenty grams to one liter of distilled water with a vigorous mixer, such as a conventional blender (not shown). If available, a vacuum blender, or equivalent, is preferred, so that the gel can be freed from any air that tends to form bubbles in the gel. The blender is normally operated at a reduced speed, perhaps with the aid of an auxiliary speed control, while adding the powder. When the powder has been added and the lid replaced, mixing can start with approximately one minute at the blender's lowest setting, followed by stop-and-start bursts, at the highest speed, for about six to eight repetitions. Mixing may be finished by an additional 35–45 seconds at a medium speed.

The unit may have capsule-forming pumps that are sensitive to the presence of air bubbles; if so, it is essential to degas the alginate. This may be accomplished by exposure to a minimum of 28" of mercury vacuum, either during the blending, or afterwards. If done during blending, it is preferable to hold the gel at this vacuum for an additional 5 to 10 minutes. If it is done after the mixing, the mixture may be held for about 20 to 30 minutes in a suitable container to handle the pressure, and the initial foaming. It has been found that warming the alginate mix to about 100° F. and agitating it, helps to break the bubbles and speeds the process. When the degassing is finished and the mixing completed, the mix will be bubble-free and will handle approximately like thin honey.

If the mixture is poured from one container to another, it is important to take care in doing this, since undue agitation tends to cause entrainment of air bubbles. One way of avoiding such a problem is to accomplish the pouring by running the solution down the wall of the second container.

The fresh alginate may be used immediately, after mixing and removal of the bubbles. Fresh alginate will work well for two or three days without refrigeration. If possible, fresh alginate should be added for each day's operation. For tomato seeds and encapsulation thereof, it has been found that approximately two to three gallons of alginate are required for a day's operation from a single nozzle. This corresponds to about 0.10 gallon to 0.15 gallon per 5,000 capsules.

The gel, when put into a suitable container 52 on the machine (See FIG. 1), is later pumped from the container 52 by clear plastic lines 60 and 60a to a pair of pneumatically operated spring-returned piston pumps 54 and 55. The two lines 60 and 60a are each connected to the container 52 through in-line valves 150a and 150b and quick couplers 60b and 60c. A separate air line 152 is attached via a quick coupler 153 to the neck of the bottle-container 52 and is controlled by a separate pressure regulator 154 at up to about 5 psi to pressurize the container 52 for the purpose of purging the alginate gel supply lines and nozzle of entrapped air bubbles.

Figure 6:
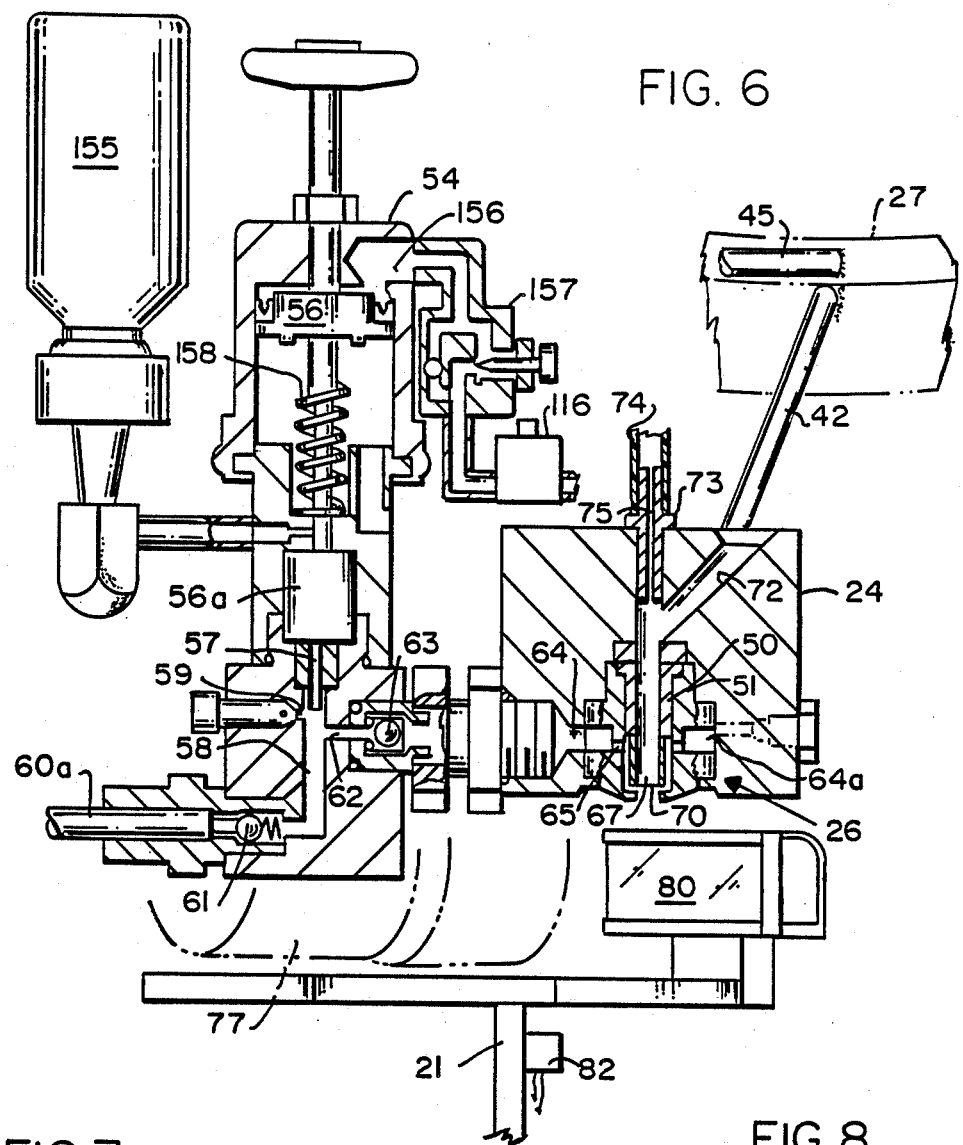
FIG. 6 is an enlarged view in elevation and in section of a portion of one of the two encapsulating nozzles.

Referring to FIG. 6, it will be seen that the pump 54 has a carefully sealed piston 56 with a projecting rod-like portion 57, at its lower end leading into a passage 58. A bleed opening 59 is provided to remove air from the passage 58 or the gel then therein, if and when that is necessary. For each pump 54 or 55 a separate container may supply lubricant for the seals 56a on pump rods 57. Also, each pump 54 or 55 has an air supply port 156 connected to a flow control valve 157 and a solenoid-controlled pilot operated valve 116. The pump 54 or 55 is pneumatically driven and is returned by a spring 158. The pump 54 or 55 is supported by a frame shelf member (not shown).

The bottom of the tube 58 is connected to a gel supply tube 60 or 60a (that leads from the container 52) by means of a check valve 61, which may be a simple ball normally held closed by a spring, but opening under pressure, because the spring is not sufficiently strong to prevent the pump from pulling the alginate gel from the tube 60 or 60a into the passage 58. The passage 58 has an outlet 62 which incorporates a check valve 63 that is open during the time when gel is forced through it, but is normally closed to prevent gel from flowing back through the outlet 62 into the passage 58.

Beyond the check valve 63, a passage 64 leads (See FIGS. 7 and 8) to an annular passage 64a from which a series of radial openings 65 lead into a passage 66, between the outer tube 51 and the inner tube 50, which provides a passage 67 for the singulated seeds. Thus, the gel fills the passage 66 between the outer and inner tubes 50 and 51. Each time an amount of gel is pumped in, that amount is regulated to be equal to the amount of gel to be expelled as a drop from the apparatus. The gel is pumped at a suitable velocity, namely that which will cause a meniscus 68 to separate from the outlet 70 at the bottom of the inner tube 50 and form a drop of gel with the seed inside when the pump reaches the end of its regulated stroke.

The configuration of the nozzle assemblies 24 or 25 as shown provide a short path for seed fall. This enables the encapsulation process to be faster than with a larger nozzle. The arrangement of the nozzle insert 26 enables a compact section elevation while also providing for the concentricity of the annular orifice between the inner and outer tubes 50 and 51. This enables reducing orifice area and consequently enables minimizing capsule size. The flow path of alginate into the nozzle 26 results in a uniform flow of alginate through the annular orifice 66a at outlet 70 and also contributes to the ability to produce small and consistent capsules. These results are assisted by the alginate entering the annular region of the nozzle 26 in a radial direction via the passages 65, and then flowing axially to the annular orifice 66a. The meniscus 68 reforms intact for successful continuous operation of the encapsulation process. This changing direction of flow of the gel appears to force a breakup of jet streams and results in a uniform flow through the annular orifice.

*The formation of drops of gel and seed encapsulation therein (FIGS. 9–12)*

The gel flows down the passage 66 and naturally flows across an outlet end 70 to form a meniscus 68. Immediately, a single seed 71 is dropped from the passage 42 into an inclined passage 72 in the nozzle assembly 24 and then via the vertical passage 67 onto this meniscus 68, (See FIGS. 9 and 10), and then a puff of air is provided by actuation of air valve 101 connected via an air conduit 74. This puff of air flows down through a narrow passage 75 in a nozzle 73 into the passage 67 of the tube 50 from a compressor (not shown) and acts to inflate slightly the meniscus 68. (See FIG. 10.)

Figure 7:
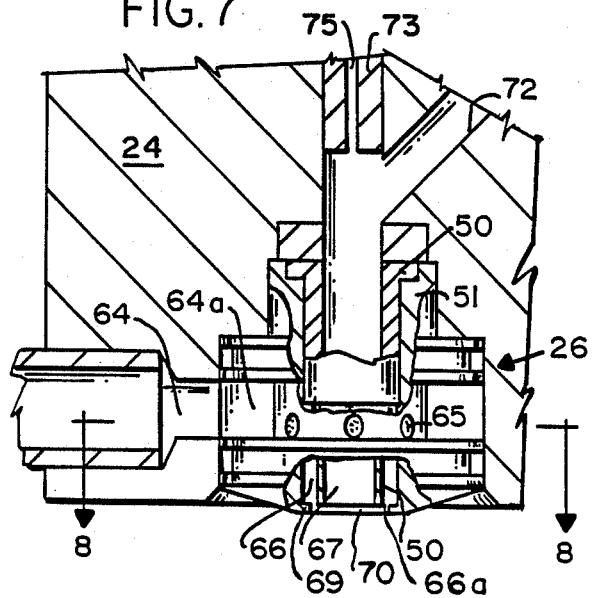
FIG. 7 is a further enlarged view in elevation and in section of a portion of one of the nozzles showing the concentric tubes and apparatus for supplying gel and seeds to the nozzle.
Figure 8:
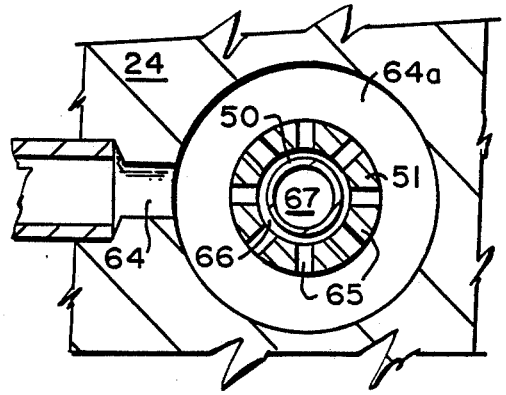
FIG. 8 is a view in section taken along the line 8—8 in FIG. 7.
Figure 12:
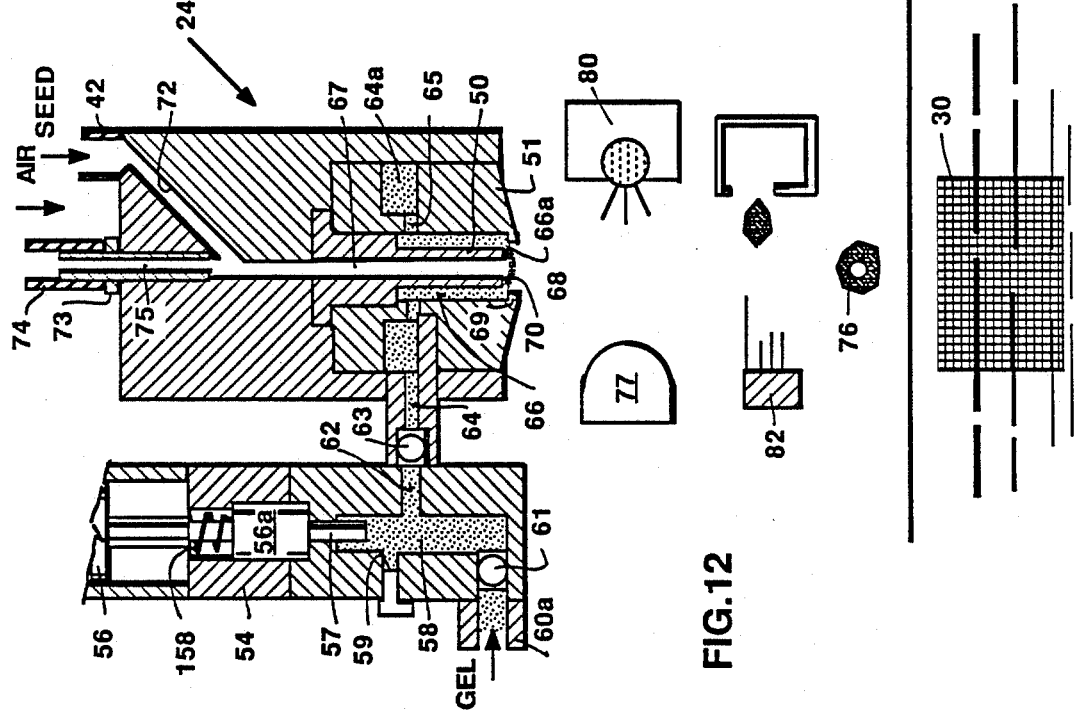
FIG. 12 is a similar view, partly broken off to conserve space, in which a drop of gel that contains no seed being deflected away from the vertical path by a puff of air, while another preceding drop that contains a seed is falling into the fixative bath.
Figure 11:
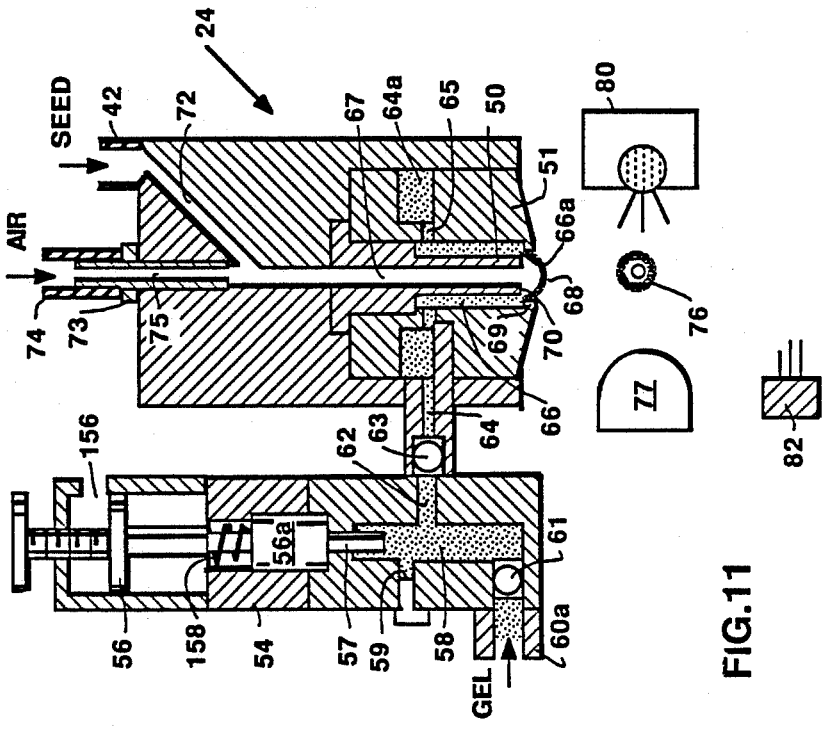
FIG. 11 is a similar view with the sensor sensing an encapsulated seed that has fallen from the nozzle.

FIG. 7 shows a lip 69 at the lower end of the outer tube 51. This lip 69, combined with the lower end of the inner tube 50 which extends slightly into the lip 69, establishes the annular orifice 66a at the lower end of the passage 66. The path 66 needs to be relatively large to allow free flow of fluid. The constriction formed by the lip 69, however, causes fluid exiting from the annular orifice 66a to establish a thin walled cylindrical flow trailing the air-driven seed and the meniscus 68. A sufficiently high discharge velocity is established by the pump drive to cause a drop 76 with a seed inside to break loose from the nozzle at a completion of the pump stroke (See FIG. 11.) The thin walled cylindrical flow established during the pump cycle separates near the nozzle surface leaving enough material to reform a meniscus 68 and enough on the drop 76 to close around the seed.

After this puff (See FIG. 10 with the somewhat inflated meniscus 68), the pump 54 pumps the gel along the passage 66 at a sufficient velocity to cause the meniscus 68, in its puffed state, to elongate and then separate from the outlet (See FIG. 11) and form a drop 76 of gel with a seed inside. It is important to have the nozzle 73 passage 75 long enough to form a well defined air jet directed at the meniscus 68.

Sensing the gel-seed drop (FIGS. 1, 2 and 9–12)

When each drop 76 of gel falls, it is observed by a sensing system comprising a light source 80 or 81 and an array or group of individual sensors—e.g., 256 by 128 sensors; by using a diagonal of the rectangular array, it is possible to use only 256 of the sensors, for example, light sensors 77 or 78. The sensor arrays 77 or 78 may be a digital camera comprising a rectangular array. The sensing system serves several purposes: (1) to count drops 76 having a seed inside it, (2) to determine whether each drop 76 has a seed inside it, and (3) to deactuate an air jet diversion apparatus 82 or 83 for deflecting those drops 76 which do not contain a seed 71 so that these sterile drops will not fall into the fixative bath in the tub-like container 31 that is located directly below the nozzles 26 and is spaced from them. This deflection means 82 or 83 preferably comprises a jet nozzle for air with a valve actuated by a solenoid, which is controlled by the seed light sensor array 77 or 78. A counter 84 or 85 is also operated by that sensor 77 or 78, and separate counts may be made as to whether the gel contains or does not contain a seed.

As indicated, the sensor array 77 or 78 is located so that it monitors the drop path directly below its nozzle 26 from which the gel drop 76 falls. The deflector 82 or 83 also operates across that path, a little lower down, but still above the receptacle 31 which contains the fixative solution for hardening the gel.

The fixative bath may comprise the somewhat flat tub 31 filled approximately ½" to ¾" from its top with a calcium chloride complex. A push button spigot 86 ay be provided for initial draining to reduce the level to a point where the tub 31 can be picked up and dumped. Wire screen strainer baskets 30 are used to keep the batches of capsules separated and are entered into the soaking bath 31 from the right side of the nozzles 26. Three such baskets 30 may be accommodated at the same time, one that is empty, one that is being filled, and one that is soaking. The soaking basket 30 preferably stays in the soaking bath 31 for at least twenty minutes, then is elevated to a rack allowing free complexing solution to drop back to the soaking bath 31. About 2500 seed containing capsules can easily be accommodated when the basket 30 is pushed back and the bubbler 32 is near the handle.

The pneumatic system

Figure 13:
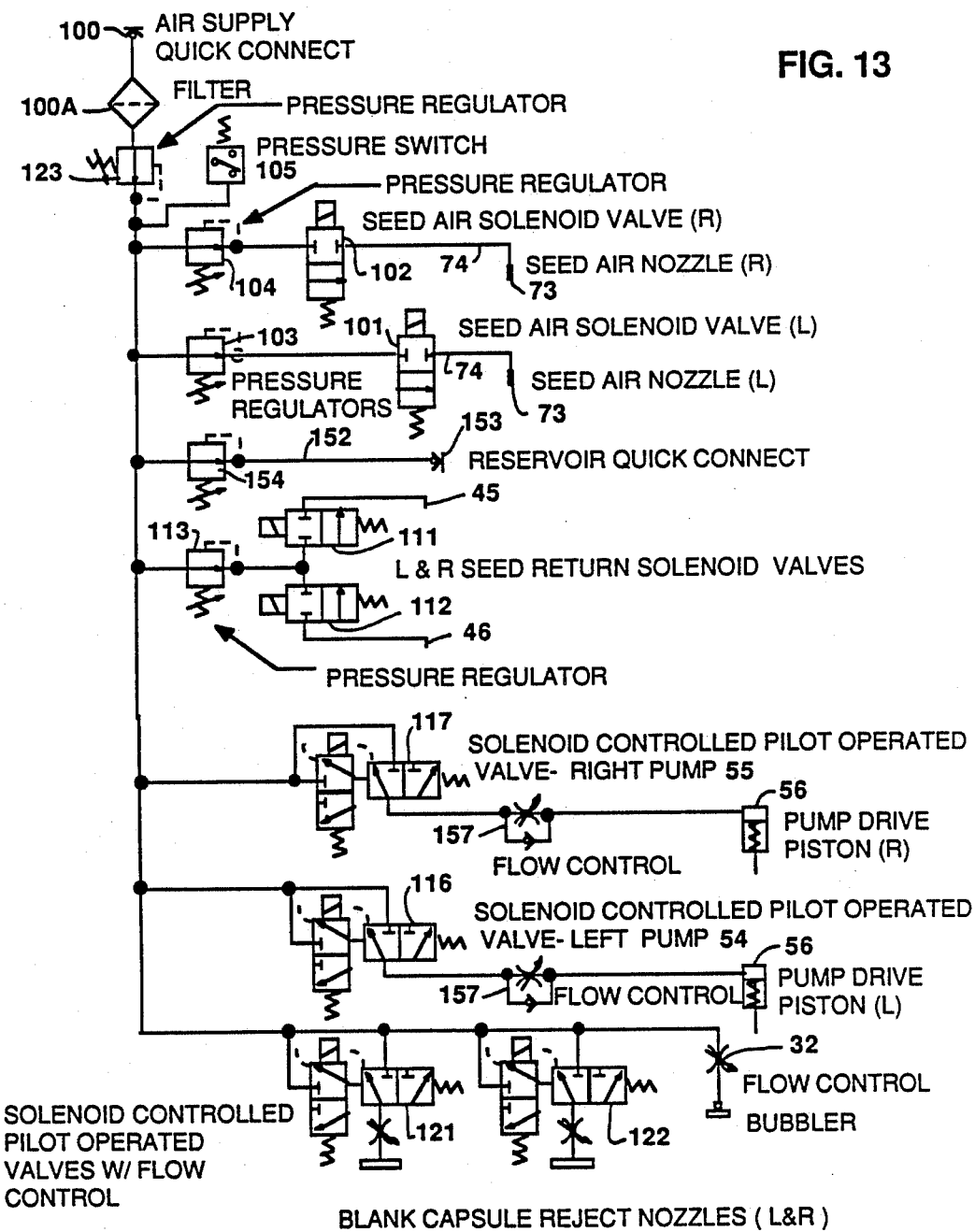
FIG. 13 is a schematic diagram of a suitable pneumatic circuit of the device.

It has been noted at various places above that air is used in several places. Preferably, as shown in FIG. 13, this pressurized air from the air supply 100 may be supplied by a single compressor at a pressure of about 100 psig and at a rate of about 3.3 scfm for a two-nozzle system. Ahead of the distribution manifold, the air passes through a filter 100a and a water trap, which should be drained daily. The filter 100a should also be periodically washed in an appropriate solvent. Replacement filters for the 15-scfm rated model air filter are readily available on the market.

Control Sequence and Control System (FIGS. 13 and 14)

Note that, as time advances from left to right in FIG. 14, the signal level for each of the several functions shifts from an elevated ON level to a lowered OFF state. At the beginning of operation, it is assumed that a meniscus 68 exists across the outlet 70 at the lower end of the inner tube 50 of the nozzle 26, that a seed 71 is on the meniscus 68, and that seed return air from the nozzles 45 and 46 (supplied via a solenoid controlled valve 101 or 102 and pressure regulator 103 or 104—at about 2 psi (See FIG. 13)) is blowing seeds back into the bowl 27 as they arrive at the upper end of the delivery tube 42 or 43. A pressure switch 105 senses system pressure. That switch 105 enables the bowl 27 to be vibrated from the vibrator 44. In the absence of adequate system pressure, the bowl 27 will not be vibrated, and seeds will not progress toward the seed delivery tubes 42 and 43. This is a safety feature which prevents dumping seeds into the nozzle assemblies 24 and 25 when air pressure is not available.

The air supply 100 (nominally 100 psi.) is regulated by a regulator 123 for a unit to 85 psi. That pressure is supplied directly to the pumps 54 and 55, the reject nozzles 82 and 83 and the bubbler 32. Each has a flow control valve to meter the rate of flow. Other functions use separate pressure regulators to reduce the air pressure as noted previously.

At the time when the control means is switched to the automatic mode, a seed-ready signal 106 is already ON indicating that a seed 71 is on the meniscus 68, and the seed-return air 107 is ON. At that time (time equal 0), the seed-return air 107 is turned OFF to allow the next seed to advance toward the seed delivery tube 42 or 43, and a capsule-form delay period 108 is initiated. At the end of the capsule-form delay period 108, the capsule-reject air 109 is turned ON and an encapsulation cycle is initiated to encapsulate the seed 71 already on the meniscus 68. Meniscus inflation air 110 (each nozzle assembly 24 and 25 is independently supplied via a solenoid controlled valve 111 or 112 and a pressure regulator 113 at 1.9 to 2.5 psi.) is actuated for a timed period (about 50 milliseconds); shortly thereafter (about 10 milliseconds) pump air 115 is actuated by a solenoid controlled, pilot operated valve 116 or 117 for a timed period (sufficient to allow completion of a full stroke of the piston 56 for each pump 54 or 55—about 50 milliseconds). The capsule-reject air 109 is turned OFF by the presence of a seed 71 detected in a capsule as it is pumped out of nozzle outlet 70. This event is indicated by the dashed vertical line on the diagram FIG. 14. The horizontal dashed line, extending to a solid vertical line indicates that if no seed is detected by the sensor 77, the capsule-reject air 109 is turned OFF again after a timed period (about 0.3 second). This manner of managing the reject air uses less air than if it were ON all the time except when a capsule with a seed is passing through.

While this capsule formation sequence has been in progress, the system is also seeking the seed to be used in the next capsule. In fact the search for that seed begins before the formation of the preceding capsule. At the beginning of the cycle, the seed-return air 107 is turned OFF: the seed-return air 107 is turned back ON after detection of a seed committed to the delivery tube, as indicated by the vertical dashed line on the diagram of FIG. 14. The horizontal dashed line and second vertical dashed line indicate that the specific time at which the seed return air 107 is turned back ON is uncertain. It happens when the seed detector 47 or 48 in the bowl 27 monitoring the leading edge of the upper end of the seed delivery tube 42 or 43 senses a seed falling into the delivery tube 42 or 43. Whenever that event occurs, it turns the seed-return air ON and initiates a seed-fall delay 120. The seed-fall delay period can be adjusted by setting a potentiometer in the control circuit. The seed-fall delay 120 is made sufficiently long (approximately 0.7 second in the present embodiment) to ensure that essentially any seed will have time to reach the meniscus 68 before the next pump action occurs. The seed is not necessarily on the meniscus 68 by the end of the set seed-fall delay period, but it should be there before the next pump action.

The end of the seed-fall delay period 120 causes the seed-ready signal 106 to switch to the ON level. In the automatic mode, this action initiates the next cycle. In the manual mode, a separate initiate-cycle pulse is required; the seed-ready signal remains ON and the seed-return air 107 remains ON awaiting such a pulse.

The capsule-reject air 109 does not go OFF until the end of the timed period. This indicates that the capsule inspection sensor 77 or 78 did not detect the presence of a seed and the capsule was rejected.

The control system counts both the number of times the pump cycles (taken to be the number of capsules formed) and the number of capsules with seeds detected by the capsule inspection sensor 77 or 78 and its valve 121 or 122 in FIG. 13. The difference in these two counts is taken to be the number of blank capsules generated. Furthermore, the control system, in its present configuration, counts consecutive blanks. When three consecutive blanks are detected, the control system initiates a clearing cycle. This involves three pump strokes without seeds being selected. After this clearing cycle, the control system reverts to normal automatic action. If a second series of three consecutive blanks is detected immediately, the control system shuts down that particular nozzle and signals the operator through an audible tone and a visual readout. The operator must take corrective action (generally clean out the nozzle and ensure that the seed supply is adequate) and reset the control system to resume operation.

As mentioned above, a flat gate was proposed and disclosed as a means of holding a seed in the delivery tubes 42 and 43 at a ready position for the next capsule while forming the present one. The gate was found to be unnecessary for the present invention. The present sequence of events takes advantage of the fact that the time for a seed to reach the upper end of the delivery tube 42 or 43 after the seed-return air 107 is turned off plus the time for the seed to fall to the meniscus 68, is at least sufficiently long to allow the pump 54 or 55 to act and a new meniscus 68 to form before the next seed could possibly reach the lower end of the inner tube 50. In fact, the search for the next seed can begin even before the pump action starts (by about 0.2 second).

Note that the total time for a cycle is the time of the seed fall delay 120 plus the time waiting for a seed to be detected at the upper end of the seed delivery tube 42 or 43.

Capsule Inspection Sensor

The capsule inspection system consists of a diffuse light source 80 or 81 focused (or nearly so) on a horizontal (approximately) photosensor array 77 or 78. A lens focuses onto the array the image of a capsule passing between the lens and the light source. The alginate gel is transparent and does not significantly reduce the amount of light reaching the photosensors, but an opaque object such as a seed 71 inside the gel capsule casts a shadow which can be detected by one or more of the sensors 77 or 78. The sensor array 77 or 78 is reset and scanned rapidly during capsule formation. Whenever two or more consecutive, adjacent sensors detect an opaque object in the field of view, that event is taken by the control system as an indication of the presence of a seed in a capsule. That event triggers the turn OFF of the capsule-reject air 109 in time to allow the capsule containing the seed to progress freely to the fixative bath. The capsule-reject air 109 is turned ON by the control system and will be turned OFF by the control system after a timed interval unless it is turned OFF earlier by the action of the capsule inspection sensor. The capsule inspection sensor 77 or 78 does not detect a transparent capsule; it detects the seed inside.

The supply of air for the reject air tubes comes from needle valves connected to the respective capsule reject solenoid valves 121 and 122 which in turn are connected to a common pressure regulator 123.

Miscellaneous Points

The unit is equipped with a power supply 125 (See FIG. 1) under the fixative bath tray. A switch with a pilot light may control all power to the unit. A sound generator with volume control may be located on the power supply. This sound generator produces an audible signal to alert the operator if a nozzle assembly 24 or 25 shuts down or when the preset total number of capsules has been formed. Receptacles in the rear of the power supply box provide power to thermostatically controlled heaters in the pumps 54 and 55 which maintain pump temperatures at about 90° F. and to the vibrator 44 control box. The receptacle for the vibrator 44 is wired through the pressure switch 105 shown in FIG. 13. The vibrator control box may be located above and behind the vibrator bowl 27. The control box preferably contains a switch to control power to the vibrator 44 and a potentiometer to control the amplitude of vibration.

The system control box may be located to the left of the vibrator control box. On the upper right corner of the face of the system control box there may be a thumb wheel switch on which can be set the number of capsules to be formed in a single basket by the two nozzle assemblies 24 and 25. Directly below there may be another thumb wheel switch on which can be set an identification number for the basket into which the capsules are being formed. In the upper left corner of the face of the control box there may be a liquid crystal display on which is displayed the count of capsules 84 or 85 formed by each nozzle assembly 24 or 25 and the count of rejects formed by each nozzle. Other messages are displayed to advise the operator of the status of the machine. The control system preferably stops capsule formation when the number of capsules formed in the preset basket number, minus the number of blank capsules detected, equals the preset number of capsules.

Across the bottom of the face of the control box they may be two sets of switches arranged in mirror image fashion from the center. The right hand switches, related to the right hand nozzle assembly 25, may select the mode, allow manual initiation of a single cycle, enable seed selection, and enable capsule sorting. A light may glow to indicate that a capsule with a seed in it has been detected. Above the light there may be a screw for adjusting the sensitivity of the capsule inspection detector. A similar set of switches controls operation of the left hand nozzle assembly 24. Beneath the liquid crystal display there may be a reset button which enables the operator to restart operation after a sequence of defective capsules has caused automatic operation to cease.

Each unit, with two nozzle assemblies 24 and 25 for each vibrating bowl 27, will stand alone and operate alone. Several units may be combined in a larger system. A bagging unit (which is commercially available) is one method of packaging the capsules. In our system, six units with a total of twelve nozzle assemblies are combined with one bagging unit. Any number of units can be combined to achieve the desired steady state encapsulation rate. Preferably, each control box communicates via a serial output with a computer (a Tandy 102). The computer interrogates each unit periodically to collect information on the number of capsules related to each basket number. When a basket is filled, cured and drained, the operator carries it to the bagging unit. The capsules are emptied into a plastic bag, perhaps in combination with capsules from other baskets. The bag, when filled, is preferably heat sealed by the bagging unit. The computer, on command of the operator, then drives a printer to print a label for the bag noting the number of capsules, the unit which formed the capsules, and other pertinent information such as the date and variety of seed. The label may be affixed to the bag by hand.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A device for encapsulating seeds in a gel, including in combination:
    a nozzle having dual vertical, rectilinear, concentric tubes, namely an inner tube having an outlet and an inlet and an outer tube,
    gel feeding means for feeding gel into said outer tube and down said outer tube to the outlet from said inner tube, so that a meniscus of gel is stretched across said outlet,
    seed feeding means for feeding singulated seeds, one at a time, into the inlet of said inner tube, so that each seed drops down upon a said meniscus of gel,
    puff means for causing a slight puff of air to pass down said inner tube and slightly inflate said meniscus after said seed has drpped thereon,
    said gel feeding means including means for causing a flow of gel to cause said meniscus to separate from said outlet and form a drop of gel with a seed inside, and
    fixative bath means, below said outlet into which each said drop of gel, with the seed inside, falls, for causing said gel to set.

2. The device of claim 1 having
    sensing means below said outlet and above said fixative bath means, for sensing each drop of gel which contains a seed,
    deflection means below said outlet and below said sensing means and above said fixative bath means for deflecting each drop of gel away from said fixative bath means when said sensing means does not sense that said drop of gel contains a seed,
    and means actuated by said sensing means, for deactivating said deflection means when said sensing means does sense that said drop of gel contains a seed, allowing said drop of gel, with the seed inside, to fall to said fixative bath.

3. The device of claim 2 wherein said deflection means comprises means for causing a jet of air to act on a non-seed-containing drop of gel when said deflection means is actuated.

4. The device of claim 2 wherein said sensing means comprises a light source and a digital array of photosensors on opposite sides of the vertical path along which each drop of gel falls.

5. The device of claim 1 wherein said gel feeding means comprises:
    a reservoir of gel,
    pumping means connected to and receiving gel from said reservoir into an intermediate conduit and from there into an outlet gel conduit connected thereto and to said outer tube for delivering gel into said outer tube,
    first check valve means between said reservoir and said intermediate conduit for preventing backflow of said gel to said reservoir, and
    second check valve means between said intermediate conduit and said outlet gel conduit preventing backflow of gel from said outlet conduit back into said intermediate conduit.

6. The device of claim 5 wherein said outlet gel conduit is connected to said outer tube by a series of radial passages fed by said outlet gel conduit.

7. The device of claim 1 wherein said means for feeding singulated seeds to said inner tube comprises:
    a bowl having a bounding circumference with a spiral ledge on an inner surface of said bowl leading up a slope to an upper outlet opening therefrom, said ledge as it approaches said upper outlet opening being only wide enough to support one seed at a time,
    vibrating means on said bowl for vibrating said bowl and thereby cause said seeds to climb said spiral ledge,
    air jet means near said upper outlet opening to blow said seeds from near said outlet opening back into said bowl,
    disable means for said air jet means for disabling said air jet means at times when it is desired to supply a single seed to said inner tube,
    conduit means leading from said upper outlet opening to said inner tube, and
    enable means to re-activate said air jet once a single seed has been delivered to said conduit means.

8. The device of claim 7 having
timing means, and
actuation means actuated by said timing means for actuating said disable means and feeding a new seed to said nozzle following delivery of the previous seed to said conduit means.

9. The device of claim 1 including counting means actuated by said timing means for counting the gel drops as they are formed.

10. The device of claim 9
sensing means below said outlet and above said fixative bath means, for sensing those drops of gel which contain a seed, and
deflection means below said outlet and below said sensing means and above said fixative bath means, actuated by said sensing means, for deflecting each drop of gel when said sensing means does not sense that said drop of gel contains a seed, deflecting said drop of gel away from said fixative bath means,
said sensing means also actuating said counting means.

11. The device of claim 10 wherein said counting means includes means for differentiating between drops with seed and drops without seeds.

12. The device of claim 9 having
disabling means for preventing delivery of seeds to said inner tube once a predetermined count has been attained, and
manually set reenabling means for resuming the supply of seeds to said inner tube after seeds of the predetermined count have been removed.

13. A device for encapsulating seeds in gel, including in combination:
a main frame,
single vibrator bowl means supported by said main frame for singulating two lines of seed therefrom,
a pair of seed-capsule-forming nozzles supported by said main frame, each nozzle having dual vertical, rectilinear, concentric tubes, namely an inner tube having an outlet and an inlet and an outer tube,
both said nozzles being supplied by said bowl means, each nozzle being supplied by one said line of singulated seeds,
a pair of gel feeding means for feeding gel into each said outer tube and down said outer tube to the outlet from said inner tube, so that a meniscus of gel is stretched across each said outlet,
a pair of seed feeding means each supplied by one said line of singulated seeds for feeding singulated seeds, one at a time, into the inlet of each said inner tube, so that each seed drops down upon a said meniscus of gel,
puff means for each said inner tube for causing a slight puff of air to pass down said inner tube and slightly inflate said meniscus after said seed has dropped thereon,
each said gel feeding means having pumping means for pumping pulses of gel into each said outer tube at an amount and rate sufficient for each pulse to cause a said meniscus to separate from its said outlet and form a drop of gel with a seed inside, and
a single fixative bath means supported by said main frame, below said outlet into which said drop of gel, with the seed inside, falls, for causing said gel to set.

14. The device of claim 13 wherein each said nozzle has
sensing means below its said outlet and above said fixative bath means, for sensing each drop of gel which contains a seed,
deflection means below that said outlet and below said sensing means and above said fixative bath means actuated by said sensing means, for deflecting those drops of gel that do not contain a seed away from said fixative bath means, and
means, actuated by said sensing means, for deactivating said deflection means when said sensing means senses that said drop of gel contains a seed, allowing said drop of gel, with the seed inside, to fall to said fixative bath.

15. The device of claim 14 wherein said deflection means comprises means for causing a jet of air to blow away each drop not containing a seed.

16. The device of claim 14 wherein each said sensing means comprises a light source and an array of light-sensitive devices on opposite sides of a vertical path along which drops of gel fall.

17. The device of claim 13 wherein each said gel feeding means comprises:
a reservoir of gel,
pumping means connected to and receiving gel from said reservoir into an intermediate conduit and from there to an outlet gel conduit connected thereto and to said outer tube for delivering gel to said outer tube,
first check valve means between said reservoir and said intermediate conduit for preventing backflow of said gel to said reservoir, and
second check valve means between said intermediate conduit and said outlet gel conduit for preventing backflow of gel from said outlet conduit into said intermediate conduit.

18. The device of claim 17 wherein said outlet gel conduit is connected to said outer tube by a series of radial passages fed by said outlet gel conduit.

19. The device of claim 13 wherein said means for feeding singulated seeds to said pair of inner tubes comprises:
a single bowl having a bounding circumference with a pair of spiral ledges on an inner surface of said bowl, each leading up a slope to an upper opening, each said ledge as it approaches its said upper opening being only wide enough to support one seed at a time,
vibrating means on said bowl for vibrating said bowl and thereby causing said seeds to climb said spiral ledges,
air jet means for each said ledge near said upper opening to blow said seeds from there back into said bowl,
disable means for each said air jet means for disabling a said air jet means at times when it is desired to supply a single seed to a said inner tube,
a pair of conduit means, each leading from a said upper opening of a said ledge to a said inner tube, and
enable means for each said air jet means to re-activate each said air jet means once a single seed has been delivered therefrom to a said conduit means.

20. A method for encapsulating seeds in a gel with the aid of a nozzle having dual vertical, rectilinear, concentric tubes, namely an inner tube having an outlet and an outer tube, comprising the steps of:

feeding gel into said outer tube and down said outer tube to the outlet from said inner tube, so that a meniscus of gel is stretched across said outlet, feeding singulated seeds, one at a time, into the inner tube, so that each seed drops down upon a said meniscus of gel, causing a slight puff of air to pass down said inner tube and slightly inflate said meniscus after said seed has dropped thereon, pumping gel to said outer tube in pulses and at an amount sufficient to cause each said meniscus after being supplied with a seed to separate from said outlet and form a drop of gel with a seed inside and to fall down, and fixing each said fallen seed-containing drop of gel and causing it to set after separating from said outlet.

21. The method of claim 20 comprising:

sensing whether each drop of gel contains a seed, and deflecting away from entering said fixing step those drops of gel that do not contain a seed and moving them away from the normal path of seed-containing drops of gel.

22. The method of claim 21 wherein said deflecting is done by impinging seedless drops of gel with a jet of air.

23. The method of claim 20 having a reservoir of gel, comprising pumping gel from said reservoir to said outer tube, while preventing backflow of said gel.

24. The method of claim 20 wherein the singulating of seeds to said inner tube is done by vibrating a seed-containing bowl having a bounding circumference with a spiral sloping ledge on an inner surface of said bowl leading to an upper outlet therefrom, said ledge as it approaches said upper edge being only wide enough to supply one seed at time, said vibrating of said bowl causing said seeds to climb said spiral ledge, normally blowing said seeds back into said bowl when they approach said upper outlet, disabling the blowing at times when it is desired to supply a single seed to said inner tube, and re-activating said blowing each time a single seed has been delivered to said inner tube.

25. The method of claim 20 including counting the gel drops after they have formed and fallen.

26. The method of claim 20 comprising preventing delivery of seeds to said inner tube once a predetermined count of falling drops of gel has been attained, and resuming the supply of seeds to said inner tube after the drops of gel making up the predetermined count have been removed.

27. A method for encapsulating seeds in gel, comprising:

supplying a flow of gel, forming a meniscus of gel, dropping a seed on to said meniscus, enlarging said meniscus and separating it from the flow of gel to form, a separated drop of gel, testing said drop of gel to determine whether it contains a seed and, if not, deflecting it away, dropping seed-containing drops of gel into a fixing bath for solidifying each said seed-containing drop of gel.

* * * * *